United States Patent [19]
Holtkamp, Sr.

[11] Patent Number: 5,111,614
[45] Date of Patent: May 12, 1992

[54] PLANT WATERING CONTAINER

[76] Inventor: Reinhold Holtkamp, Sr., Werther Strasse 112, D-4294 Isselburg, Fed. Rep. of Germany

[21] Appl. No.: 588,847

[22] Filed: Sep. 27, 1990

Related U.S. Application Data

[63] Continuation of Ser. No. 504,054, Apr. 4, 1990, which is a continuation of Ser. No. 281,622, Dec. 9, 1988, abandoned.

[51] Int. Cl.$^5$ ............................................. A01G 25/00
[52] U.S. Cl. ................................................... 47/81
[58] Field of Search .................................... 47/80–84, 47/79, 48.5, 41.12, 71

[56] References Cited

U.S. PATENT DOCUMENTS

| | | | |
|---|---|---|---|
| 2,463,719 | 3/1949 | Schackett et al. | 47/66 |
| 4,213,271 | 7/1980 | Petruzzi et al. | 47/71 |
| 4,236,353 | 12/1980 | Sovenson | 47/81 |
| 4,250,665 | 2/1981 | English et al. | 47/81 |
| 4,299,054 | 11/1981 | Ware | 47/81 |
| 4,339,891 | 7/1982 | Bassett | 47/71 |
| 4,525,950 | 7/1985 | Glassman | 47/66 |
| 4,756,121 | 7/1988 | Wild | 47/48.5 |
| 4,858,381 | 8/1989 | Walton et al. | 47/79 |

FOREIGN PATENT DOCUMENTS 3446677  10/1986  United Kingdom ............... 47/80

Primary Examiner—David A. Scherbel
Assistant Examiner—Michele A. Van Patten
Attorney, Agent, or Firm—Foley & Lardner

[57] ABSTRACT

A plant watering container comprised of lower and upper mating container sections. The top wall of the upper section is formed with a central opening for supporting a pot, with a wick extending into the growing media in the bottom of the pot and downwardly into the water reservoir provided by the lower container section. The upper container section is formed with beveled side edges similar in angularity to the normal droop angle of plant leaves, whereby the beveled surfaces form supporting surfaces for the leaves. The container is very inexpensive to manufacture and provides a simple bottom watering device utilizing capillary action for the watering of plants in very small pots.

11 Claims, 1 Drawing Sheet

PLANT WATERING CONTAINER

This application is a continuation of application Ser. No. 07/504,054, filed Apr. 4, 1990, which is in turn a continuation application of Ser. No. 07/281,622 filed Dec. 9, 1988 now abandoned.

BACKGROUND OF THE INVENTION

The present invention relates as indicated to a plant watering container, and relates more particularly to an inexpensive and efficient container for transferring water to the growing media in a plant pot by capillary action.

There are a myriad of watering devices of various types for supplying programmed amounts of water to a pot, including supplying water only to the bottom of the pot. There are many plant species, for example, African violets, in which bottom watering is greatly preferred. Top watering tends to result in over watering of the plant, whereas bottom watering, if done properly, tends to provide sufficient moisture to the plant without the adverse affects of over watering. In each of my earlier U.S. Pat. Nos. 4,343,109 and 4,434,577, a watering tray is provided within which is positioned a support member. A water absorbing pad is positioned on top of this support, with the support being formed with a generally central opening through which a tab cut from the pad material can be depressed for water contact. A pot having a plurality of openings in its bottom wall is positioned on the support, and through capillary action water is transmitted through the tab to the pad, and from the pad through the openings in the pot to the growing media. In both of the patented devices, the support is of smaller diameter than the top of the tray thereby making it rather easy to periodically replenish the water, particularly inasmuch as the watering devices were designed for 4 inch pots. Moreover, due to the mounting of the support within the tray, the amount of water remaining within the tray can be quickly visually determined.

There are many other devices and pot designs for the bottom watering of potted plants. However, to the best knowledge of the inventor, all of these are designed for pots in the range of 3-4 inches in diameter, or even substantially larger. The prior art arrangements, including those of the present inventor, simply are not satisfactory when dealing with miniaturized pot containers. Miniature plants are a relatively recent development in the breeding and production of African violets. Miniature plants are similar in essentially all respects to plants sold in approximately four inch pots, but are grown in pots approximately 4 cm. or 1.5 inches, and even smaller. A pot approximately 4 cm. in diameter at the top is approximately 3 cm (approximately 1.2 inches) tall. It will be readily apparent that practical obstacles are faced when prior art bottom watering devices are attempted to be relied upon in pots of this size. Although it is possible to position the relatively small pot in a much larger tray, the level of the water in the tray must be kept to a minimum to avoid bottom over watering. Where the tray is very shallow and only slightly greater in diameter than the bottom of the pot, it is very difficult if not impossible to admit water to the small gap between the pot and the top wall of the tray, particularly water in amounts that avoid over watering but yet provide sufficient water to last over a period of days.

As apparent from the foregoing, the providing of proper amounts of water to miniaturized plants has presented a substantial problem which, prior to the present invention, has not been solved. This, in turn, has led and can lead to customer dissatisfaction due to unsatisfactory performances of the miniaturized plants.

SUMMARY OF THE INVENTION

With the above in mind, it is an object of the invention to provide a watering container specifically adapted for miniaturized plants, although plants of greater sizes can also be accommodated. In accordance with the invention, the container comprises upper and lower housing sections which have adjacently disposed flanges which interengage when the upper section is positioned over the bottom section. The container can be filled with water or liquid approximately to the top of the bottom section, which forms a reservoir. The upper housing section is formed in the top wall thereof with a central opening through which extends the body portion of the miniature pot. The pot is formed with a diametrically enlarged upper rim portion, the bottom surface of which engages the upper wall around the central opening.

A further object of the present invention is to provide a device of the type described in which water or other liquid can be systematically transferred to the plant growing media, while at the same time providing a water reservoir sufficient in size so that the plant can be supplied for several days before water replenishment is necessary. The bottom of the pot when mounted in the container is just above the water level when the reservoir is filled. A wick of absorbent material extends upwardly through an opening in the bottom wall of the pot into firm engagement with the growing media, and extends downwardly from the pot substantially toward the bottom of the reservoir. Water is accordingly continuously transferred to the growing media by capillary action.

A further object of the invention is to provide a watering container that can be inexpensively manufactured. In accordance with the invention, the container comprises but two housing sections, which can be relatively simply and inexpensively produced by molding.

Yet another feature of the invention is the configuration of the top wall of the upper housing section to avoid damage to overhanging leaves. In accordance with the invention, the edge of the top wall is beveled around its entire circumference so that the bottom leaves of the plant which distend downwardly can be supported by the beveled surface in their natural orientation. The provision of an edge or line surface at the periphery of the upper housing section could cause damage or breakage to the leaves and leaf stems of the plant.

These and other objects of the advantages of the invention will become apparent as the following description proceeds in particular reference to the application drawings.

DETAILED DESCRIPTION OF THE PREFERRED EMBODIMENTS

The container of the present invention is generally indicated at 10, adapted to support a pot 12 containing a plant represented at 14. Although the concepts of the present invention are generally applicable to all species of plants, they are particularly well suited to plants where bottom watering is greatly preferred, such as African violets.

Figure 2:
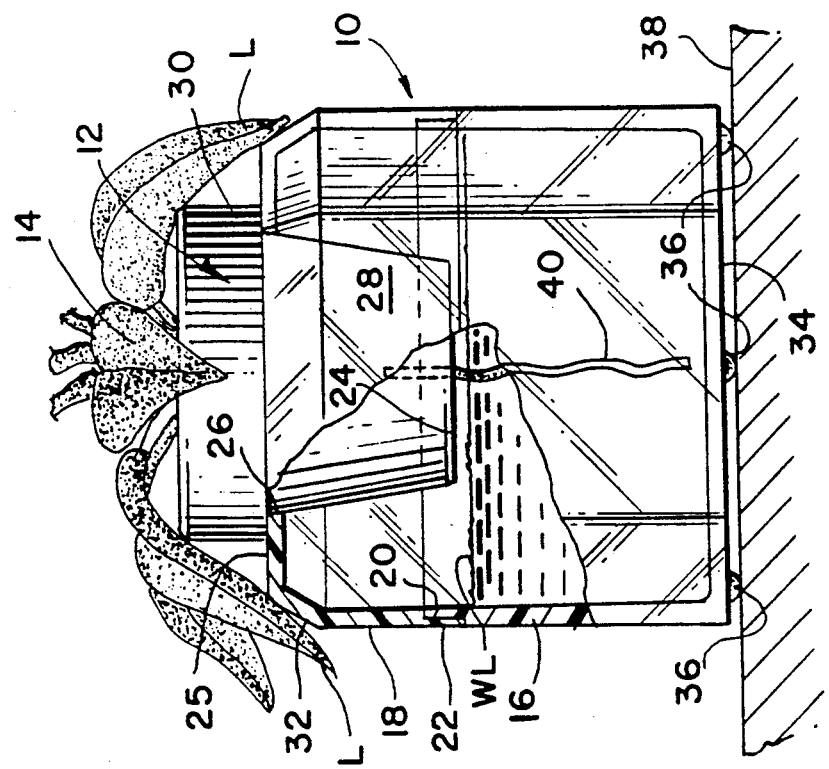
FIG. 2 is the front elevational view, partly in section, showing the container construction in more detail.

As can best be seen in FIG. 2, the container 10 comprises a lower container part or section 16 and an upper container part or section 18. The lower section 16 is formed with an inwardly offset continuous upper flange 20, with the offset being dimensioned to provide an outer continuous groove to receive a downwardly depending bottom flange 22 of the upper section 18. At the regions of the bottoms of the flanges 20 and 22, shoulders are provided to receive the opposite flanges. The flanges and grooves in which they are positioned are dimensioned so that the upper section frictionally fits snugly on the lower section but can be easily removed when it is desired to replenish the water supply in the reservoir formed by the lower section 16. The water level WL as shown in FIG. 2 is typically just below the top of the lower section 16 as defined by the flange 20, and is slightly spaced from the bottom 24 of the pot.

The top wall 25 of the upper section 18 is formed with a central opening 26 which in the form shown is circular to accommodate the shape of the pot. The body 28 of the pot extends downwardly through the opening, and the upper rim 30 of the pot is supported by the area of the top wall 25 that immediately surrounds the opening 26. The bottom of the rim is laterally outwardly offset from the body portion of the pot, in the usual manner, to provide a shoulder which engages the top wall 25 around the opening 26.

Figure 1:
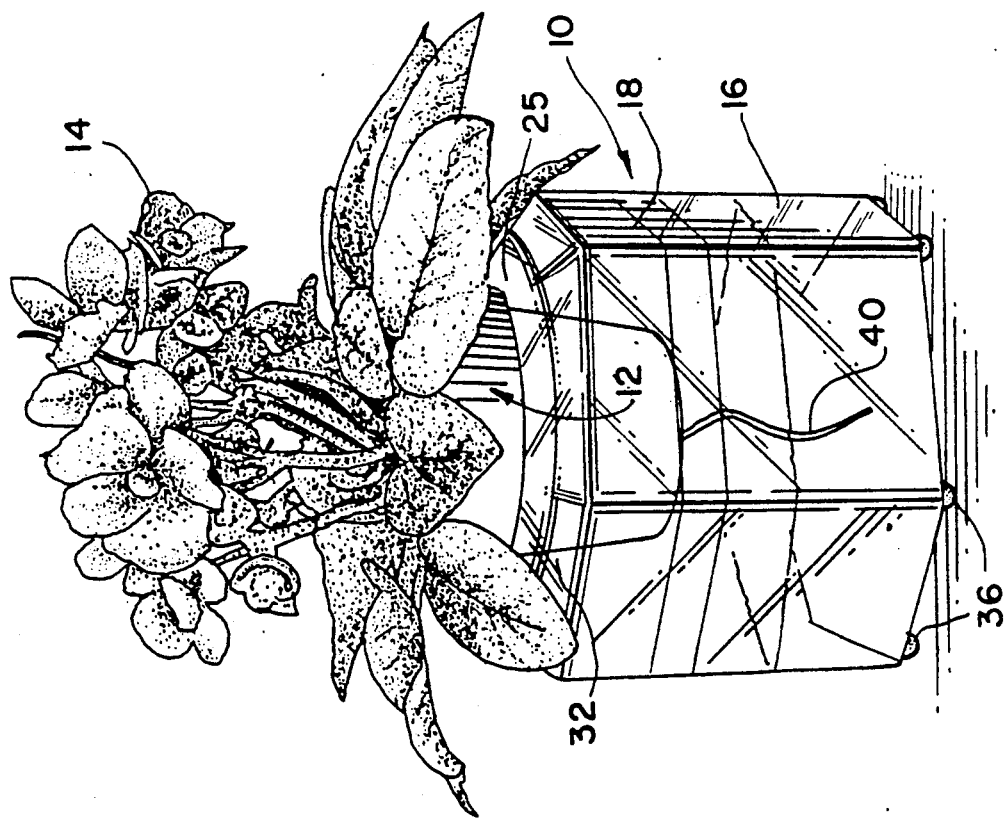
FIG. 1 is a perspective view showing the container of the present invention, with a potted plant supported in the top wall of the container.

Although it will be seen in FIG. 1 that the cross-sectional shape of both the upper and lower container sections 16 and 18 is hexagonal, it will be apparent that any configuration can be successfully employed, for example, round, square, or any number of sides greater or less than six. It will further be noted that the top wall 25 is circular, defining an annular band between the central opening 26 and the beveled edges 32 of the container.

Depending downwardly from the bottom wall 34 of the lower container section 16 are a plurality of supporting feet commonly designated at 36. These function to elevate the container above the supporting surface so as to protect such surface. Any suitable number of feet can be provided, with the preferred embodiment having a foot at the intersection of each of the walls of the lower section of the container.

The beveled surface 32 of the upper container section provides a ledge or surface which leaves can engage and rest on, without causing damage or breakage of the leaves, shown at L in FIG. 2. If the top wall 25 and the side walls of the upper section were joined perpendicularly, the resulting edge would produce a sharp edge which could potentially damage or break the leaves, particularly if pressure were to be placed on the leaves at a point to either side of the edge. The beveled surface acts as a natural supporting surface for the leaves, while at the same time providing an attractive appearance. Although the angular orientation of the surface 32 is not critical, an angle of 30° to the vertical has proved very satisfactory.

As shown in FIG. 2 and noted above, the bottom wall 24 of the pot is positioned just above the water line WL, which is approximately the upper level of water replenishment in the container. A wick 40 extends upwardly through an opening (not shown) in the bottom wall of the pot into the growing media, and extends downwardly to a point adjacent to the bottom wall 34 of the lower container section 16, although the length of the wick can be varied as desired. The wick can be made of any material providing a capillary action, for example, cotton, wool, synthetic fabrics, combinations of these, or other materials which will provide the necessary capillary water transmission. A small tool may be advantageously applied for inserting the wick into the growing media so that it does not become dislodged during use. The cross section of the wick is chosen to provide the necessary capillary action, taking into account the material being employed.

The edge of the central opening 26 formed in the upper wall is preferably inwardly beveled to provide better seating for the uppermost diametral portion of the body 28 of the pot, with the body tapering downwardly and inwardly as shown in the drawings.

The upper and lower container sections 16 and 18 can be formed of any suitable material, and are preferably molded from a suitable plastic material, with the supporting feet 36 being integrally formed during the molding process. The plastic is preferably transparent as shown in the application drawings, with the advantage of this being that the water level is immediately visible at all times. When the level has dropped to a point adjacent to the bottom of the wick 40, the upper container part 18, with the pot remaining positioned therein, can be simply lifted and water added to the bottom container approximately to the level WL shown. At this level, water does not contact the bottom of the pot so that over watering is avoided.

Although the invention concepts are applicable to different size containers and pots, the container is particularly well adapted for use with miniature pots 4 cm. in diameter or less. In a container specifically designed for pots of this size, the overall diameter of the container is approximately 5.7 cm., and the overall height 5.2 cm. A very compact container is thereby provided, one in which the pot is firmly supported and wherein the growing media systematically receives water through the wick 40, by capillary action. In the event pots of substantially greater diameter are supported by containers correspondingly greater in size and diameter, the size of the wick or the number of wicks could be adapted to the amount of water required to be transferred by capillary action. Although a relatively thin wick is entirely satisfactory for 4 cm. pots, much greater amounts of water would be required to be transmitted to pots of substantially greater size. It will be understood by those skilled in the art that wicks or similar absorbing material suitable in material and dimension could be satisfactorily utilized.

Minor variations of the container disclosed and illustrated will suggest themselves to those skilled in the art without, however, departing from the concepts of the invention as defined by the appended claims.

What is claimed is:

1. A watering container for a potted plant, comprising:
    a) a lower container section having a side wall and a bottom wall which together define a reservoir for holding liquid, said lower container section being open at the top and said side wall being formed with a continuous mounting flange at the upper end thereof, the top of the lower container section defining the fluid capacity of the reservoir;

b) an upper container section having a top wall, a continuous side wall and having an open bottom, said side wall being formed with a continuous mounting flange at its bottom, said top wall being formed with an opening adapted to receive a pot containing plant material in a growing medium;

c) the continuous mounting flanges of the lower and upper container sections being cooperatively configured and dimensioned to form a continuous interengagement surface when the upper container section is positioned over the lower container section to form an assembled container, such arrangement serving to inhibit and close the container against evaporation and the drying out of plant roots;

d) a plurality of supporting feet projecting downwardly from the bottom surface of the bottom wall of the lower container section and being within the confines of the side wall of the lower container section so as to position the container above the supporting surface therefor, thereby inhibiting moisture transfer to the supporting surface from the container; and e) a downwardly and outwardly beveled continuous wall extending around the periphery of the top wall of the upper container section between the top wall and the side wall thereof, the beveled wall forming a supporting surface for leaves of the potted plant extending downwardly below the top of the pot.

2. The watering container of claim 1, wherein the opening formed in the top wall of the upper container section is centrally located within the top wall and defined at its circumference by a downwardly and inwardly beveled surface, the angle of the bevel closely corresponding to the taper of a supported pot, thereby to increase the contact support area between the pot and the top wall.

3. The watering container of claim 2, wherein the beveled wall is formed at an angle of 30° to the vertical.

4. The watering container of claim 1, wherein the upper and lower sections are each formed of transparent plastic material.

5. The watering container of claim 1, wherein the mounting flange of the lower container section is inwardly offset from the outer surface of the side wall of such container section so as to provide an outer annular groove defined at its bottom by a supporting shoulder, and the mounting flange of the upper container section is defined by an inner annular groove adapted to receive the mounting flange of the lower container section, the widths of the respective outer and inner grooves being such that the outer surfaces of the side walls of the lower and upper container sections are continuous when the sections are assembled.

6. A watering container for a potted plant, comprising:

a) a lower container section having a continuous side wall and a bottom wall, the walls being closed to define a reservoir for holding liquid, the lower container section being open at the top and said side wall being formed with a continuous vertical mounting flange at the upper end thereof, the top of the lower container section defining the fluid capacity of the reservoir;

b) an upper container section having a top wall, a side wall, and an open bottom, the side wall being formed with a continuous vertical mounting flange at its bottom, the top wall being formed with an opening adapted to receive a pot containing plant material in a growing medium;

c) the continuous mounting flanges of the lower and upper container sections being cooperatively configured and dimensioned to form a continuous interengagement surface when the upper container section is positioned over the lower container section to assembly and close the container to inhibit evaporation and the drying out of the plant roots;

c) a pot mounted in the opening in the top wall of the upper container section, the pot having a top rim with a bottom surface engaging the top wall immediately around the opening, the pot also having a downwardly and inwardly tapered portion and a bottom wall containing at least one opening, the bottom wall of the pot being positioned laterally adjacent the area of interengagement of the mounting flanges of the lower and upper container sections, respectively;

e) a water absorbing member extending into the bottom of the pot through said at least one opening and extending toward the bottom wall of the lower container section, whereby liquid is transferred from the reservoir through the absorbing member to the pot through capillary action;

f) a plurality of supporting feet projecting downwardly from the bottom surface of the bottom wall of the lower container section and being within the confines of the side wall of the lower container section so as to position the container above the supporting surface therefor, thereby inhibiting moisture transfer to the supporting surface from the container; and g) a downwardly and outwardly beveled continuous wall extending around the periphery of the top wall of the upper container section between the top wall and the side wall thereof, the beveled wall forming a supporting surface for leaves of the potted plant extending downwardly below the top of the pot.

7. The watering container of claim 6, wherein the opening formed in the top wall of the upper container section is centrally located within the top wall and defined at its circumference by a downwardly and inwardly beveled surface, the angle of the bevel closely corresponding to the taper of the supported pot, thereby to increase the contact support area between the pot and the top wall.

8. The watering container of claim 7, wherein the beveled wall is formed at an angle of 30° to the vertical.

9. The watering container of claim 6, wherein the upper and lower container sections are each formed of transparent plastic material.

10. The watering container of claim 6, wherein the mounting flange of the lower container section is inwardly offset from the outer surface of the side wall of such container section so as to provide an outer annular groove defined at its bottom by a supporting shoulder, and the mounting flange of the upper container section is defined by an inner annular groove adapted to receive the mounting flange of the lower container section, the widths of the respective outer and inner grooves being such that the outer surfaces of the side walls of the lower and upper container sections are continuous when the sections are assembled.

11. A watering container for a potted plant, comprising:
 a) a lower container section having a side wall and a bottom wall which together define a reservoir for holding liquid, said lower container section being open at the top and said side wall being formed with a continuous mounting flange at the upper end thereof, the top of the lower container section defining the fluid capacity of the reservoir;
 b) an upper container section having supporting means at the top thereof, said supporting means defining an opening adapted to receive a pot containing plant material in a growing medium, said pot having a flange adapted to rest on and be supported by said supporting means, said upper container section further including a continuous side wall and an open bottom, said side wall being formed with a continuous mounting flange at its bottom;
 c) the continuous mounting flanges of the lower and upper container sections being cooperatively configured and dimensioned to form a continuous interengagement surface when the upper container section is positioned over the lower container section to form an assembled container, such arrangement serving to inhibit and close the container against evaporization and the drying out of plant roots;
 d) a plurality of supporting feet projecting downwardly from the bottom surface of the bottom wall of the lower container section and being within the confines of the side wall of the lower container section so as to position the container above the supporting surface therefor, thereby inhibiting moisture transfer to the supporting surface from the container; and
 e) a downwardly and outwardly beveled continuous wall extending around the periphery of the upper container section laterally between said supporting means and said side wall, said beveled wall forming a supporting surface for leaves of the potted plant extending downwardly below the top of the pot.

* * * * *